F. SEEL.
CHURN.
No. 178,472.  Patented June 6, 1876.
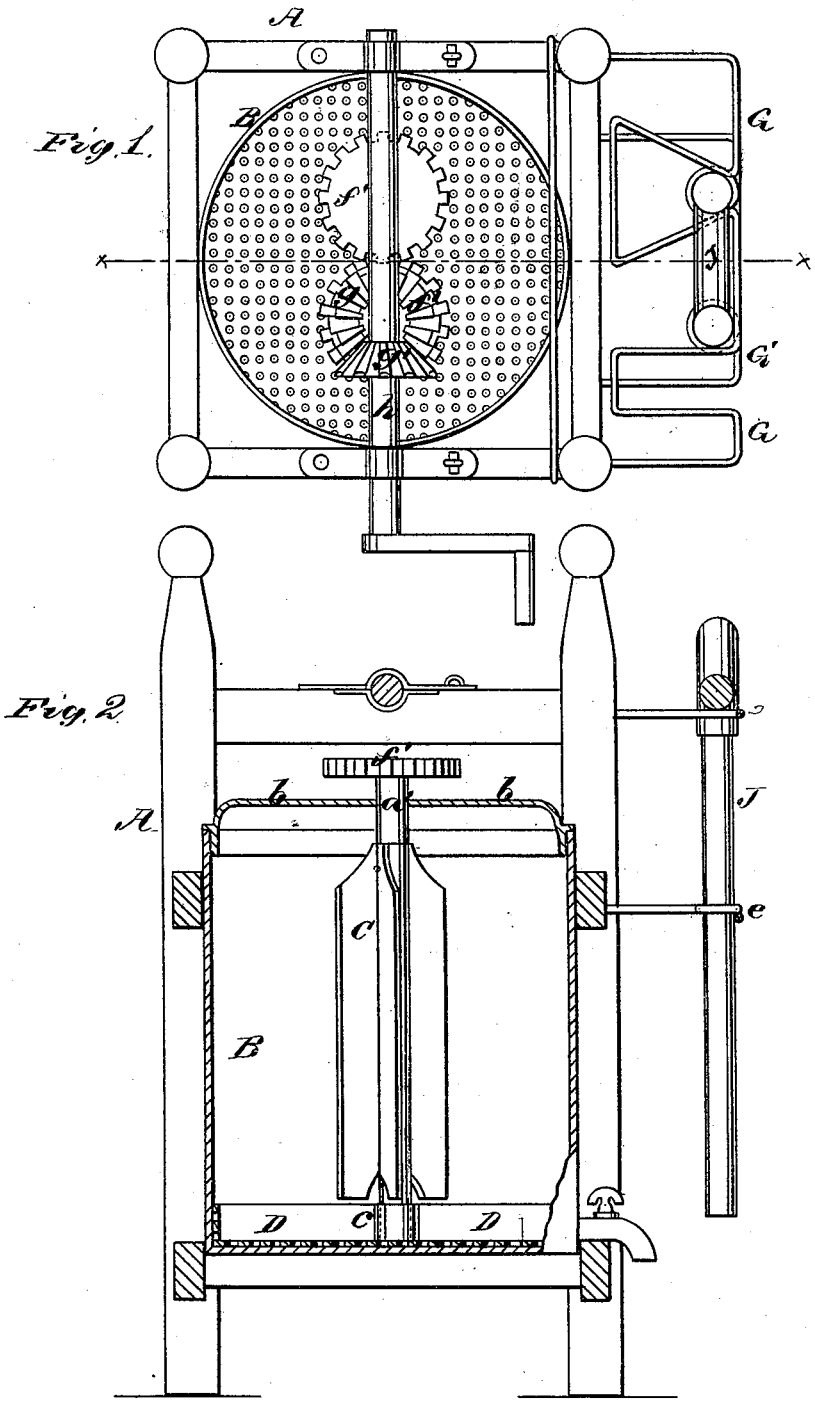
WITNESSES  
M. J. Utley  
E. H. Bates
INVENTOR  
Frederick Seel.  
Gilmore, Smith &Co.  
ATTORNEYS

UNITED STATES PATENT OFFICE.

FREDERICK SEEL, OF CINCINNATI, OHIO.

IMPROVEMENT IN CHURNS.

Specification forming part of Letters Patent No. 178,472, dated June 6, 1876; application filed April 15, 1876.

*To all whom it may concern:*

Be it known that I, FREDERICK SEEL, of Cincinnati, in the county of Hamilton and State of Ohio, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my churn. Fig. 2 is a longitudinal vertical section of the same.

This invention has relation to churns; and the nature of my invention consists, mainly, in a strainer which rests upon the bottom of the churn-box, for straining the milk, and which is constructed with tubular bearings for the rods of the dashers, said strainer being readily removable by means of a pair of tongs, as will be hereinafter explained. The invention also consists in racks attached to the churn-frame, and adapted for holding the detachable parts of the churn while cleaning the same, as will be hereinafter explained.

In the annexed drawings, A is the frame of the churn, and B the churn-barrel, which is rigidly secured in this frame, and provided with a cock near its bottom, for drawing off the milk after churning, and also for drawing off the water after washing the barrel. Inside of the barrel B are two rotary upright dashers, C C, composed of blades secured to shafts $a\ a'$. The upper portions of the dash-shafts $a\ a'$ are guided by two removable semicircular covers, $b\ b$, and the lower portions of the dash-shafts are guided by tubes $c$, which rise from a shallow pan-shaped strainer, D, that fits snugly in the barrel B. By means of a wooden fork, J, the ends of which are inserted into the tubes $c$ and pressed apart, the strainer D can be conveniently removed from the barrel. On the upper end of the shaft $a$ is a spur-wheel, $f$, which engages with a spur-wheel, $f'$, on the shaft $a'$, on which shaft is also keyed a beveled spur-wheel, $g$, which engages with a bevel spur-wheel, $g'$, on a shaft, $h$, that is removable from its bearings.

On one side of the frame A are wire racks G G'. The upper rack G is bent as shown in Fig. 1, forming angles adapted to receive and hold the dashers when they are taken out of the barrel. The dashers rest upon the lower rack G', which has eyes $e\ e$ through it, through which the fork J is kept in a convenient place when not in use.

What I claim as new, and desire to secure by Letters Patent, is—

The removable strainer D, having the tubes $c$ rigidly secured thereto, and adapted to receive the fork J, substantially as described, and for the purpose set forth.

In testimony that I claim the above I have hereunto subscribed my name in the presence of two witnesses.

FREDERICK SEEL.

Witnesses:
T. G. HELMKE,
LOUIS NAEGELE.